(12) United States Patent
Ackermanns et al.

(10) Patent No.: US 7,485,226 B2
(45) Date of Patent: *Feb. 3, 2009

(54) DEVICE FOR RECEIVING AND SEPARATING CHIPS AND COOLING LIQUID DISCHARGED FROM MACHINE TOOLS (SEALING)

(75) Inventors: Leo J. P. Ackermanns, Schin op Geul (NL); Rimmond H. B. Souren, Meersen (NL)

(73) Assignee: Mayfran International, B.V., Landgraaf (NL)

( * ) Notice: Subject to any disclaimer, the term of this patent is extended or adjusted under 35 U.S.C. 154(b) by 362 days.

This patent is subject to a terminal disclaimer.

(21) Appl. No.: 11/347,891

(22) Filed: Feb. 6, 2006

(65) Prior Publication Data

US 2006/0124523 A1    Jun. 15, 2006

Related U.S. Application Data

(63) Continuation of application No. 10/492,486, filed on Apr. 9, 2004, now Pat. No. 7,014,764.

(30) Foreign Application Priority Data

May 24, 2002    (DE) ................................ 102 23 294

(51) Int. Cl.
B23Q 11/00    (2006.01)
B01D 36/04    (2006.01)
B01D 33/073    (2006.01)

(52) U.S. Cl. ..................... 210/297; 210/298; 210/402; 210/380.3; 210/497.01

(58) Field of Classification Search .................. 210/297, 210/298, 402, 380.3, 497.01
See application file for complete search history.

(56) References Cited

U.S. PATENT DOCUMENTS

| 4,145,288 A | 3/1979 | Crowe |
| 4,147,635 A | 4/1979 | Crowe |
| 4,159,948 A | 7/1979 | Crowe |
| 4,735,730 A | 4/1988 | Bratten |
| 4,746,444 A | 5/1988 | Creps |
| 5,167,839 A * | 12/1992 | Widmer et al. ............... 210/784 |

(Continued)

FOREIGN PATENT DOCUMENTS

JP    2000 202215 A    7/2000

(Continued)

OTHER PUBLICATIONS

International Search Report PCT/EP 03/05244 dated Aug. 12, 2003.

*Primary Examiner*—Thomas M Lithgow
(74) *Attorney, Agent, or Firm*—Calfee, Halter & Griswold LLP

(57) ABSTRACT

A device for receiving and separating chips and coolant discharged from machine tools having a filter drum that has an internal bearing ring on each of its two ends, which each engage in an external bearing ring so that they rotate together. Spring elements, which run parallel to the axis of the filter drum, may be provided which are supported on one side on the internal bearing ring and on the other side on the external bearing ring. Sealing elements may be provided to prevent undesired flow of unfiltered coolant.

17 Claims, 4 Drawing Sheets

U.S. PATENT DOCUMENTS

Figure 8:
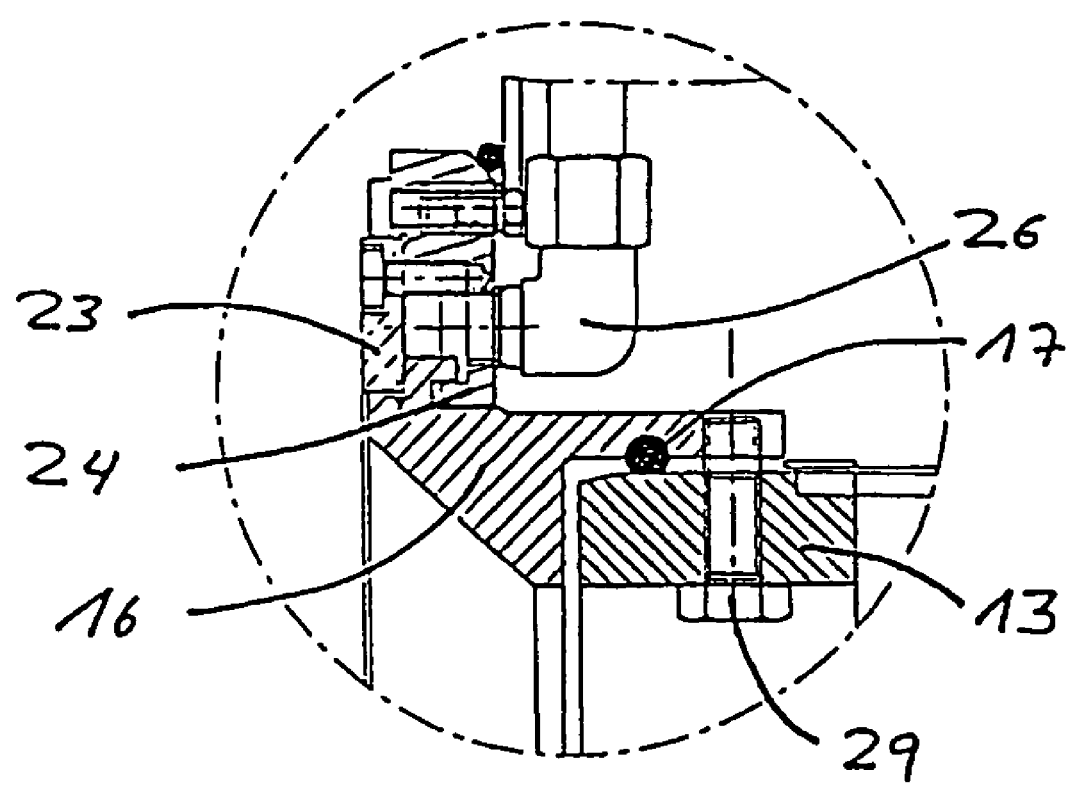

| | | | |
|---|---|---|---|
| 5,328,611 A | 7/1994 | Lenhart | |
| 5,603,846 A * | 2/1997 | Uchiyama et al. | 210/784 |
| 5,849,183 A | 12/1998 | Ota et al. | |
| 5,871,643 A | 2/1999 | Ota | |
| 6,093,315 A | 7/2000 | Croket | |
| 6,117,339 A | 9/2000 | Croket | |
| 6,332,983 B1 | 12/2001 | Tashiro et al. | |
| 6,475,377 B1 | 11/2002 | Fox et al. | |
| 7,014,764 B2 * | 3/2006 | Ackermanns et al. | 210/297 |

FOREIGN PATENT DOCUMENTS

| | | |
|---|---|---|
| JP | 2000 300914 A | 10/2000 |
| JP | 2002 102608 A | 4/2002 |

* cited by examiner

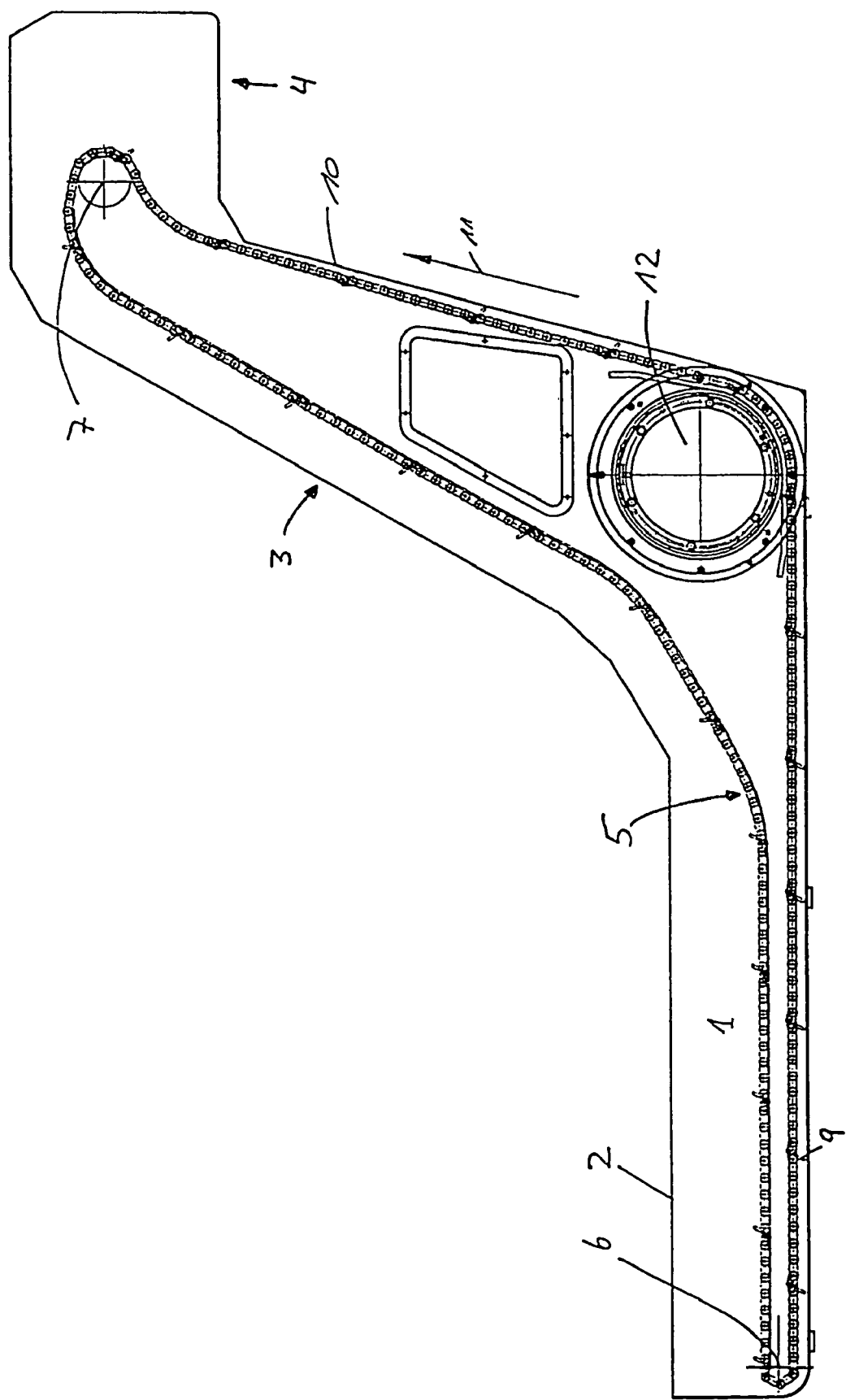

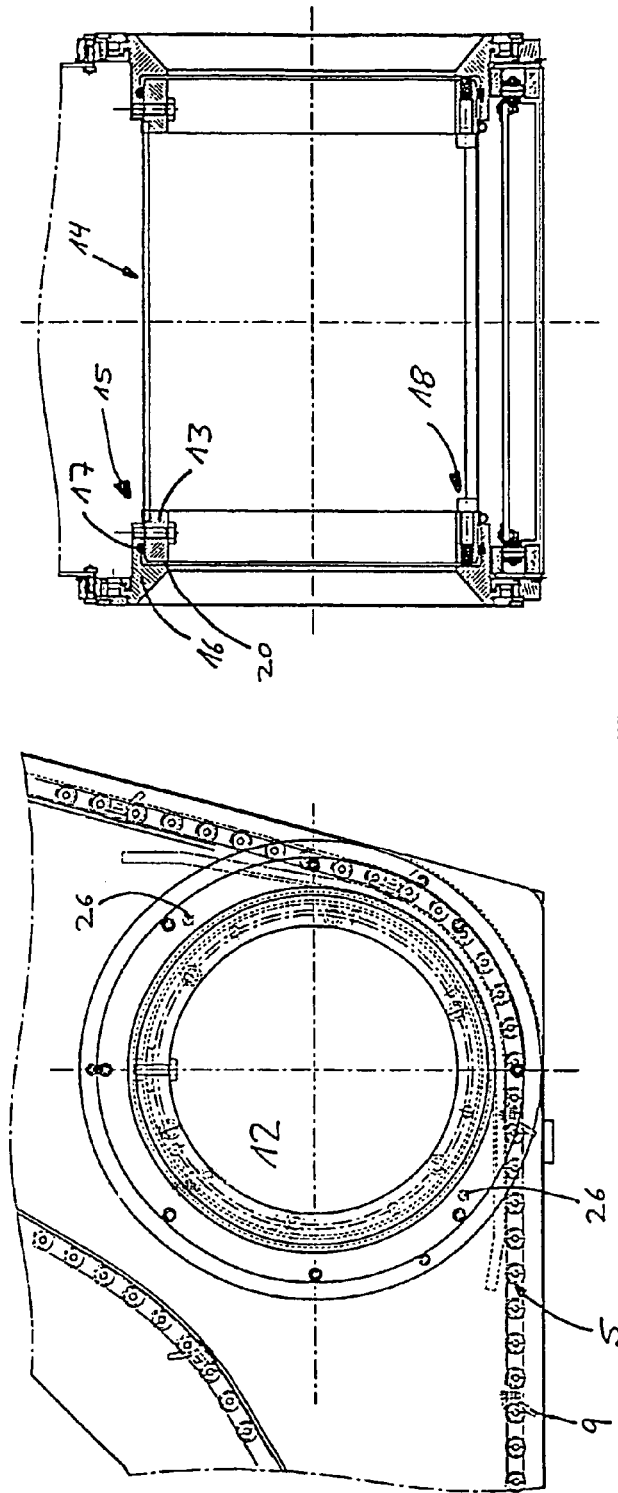
Fig. 3
Fig. 2
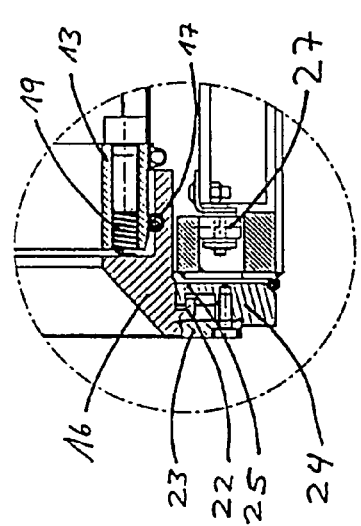
Fig. 4

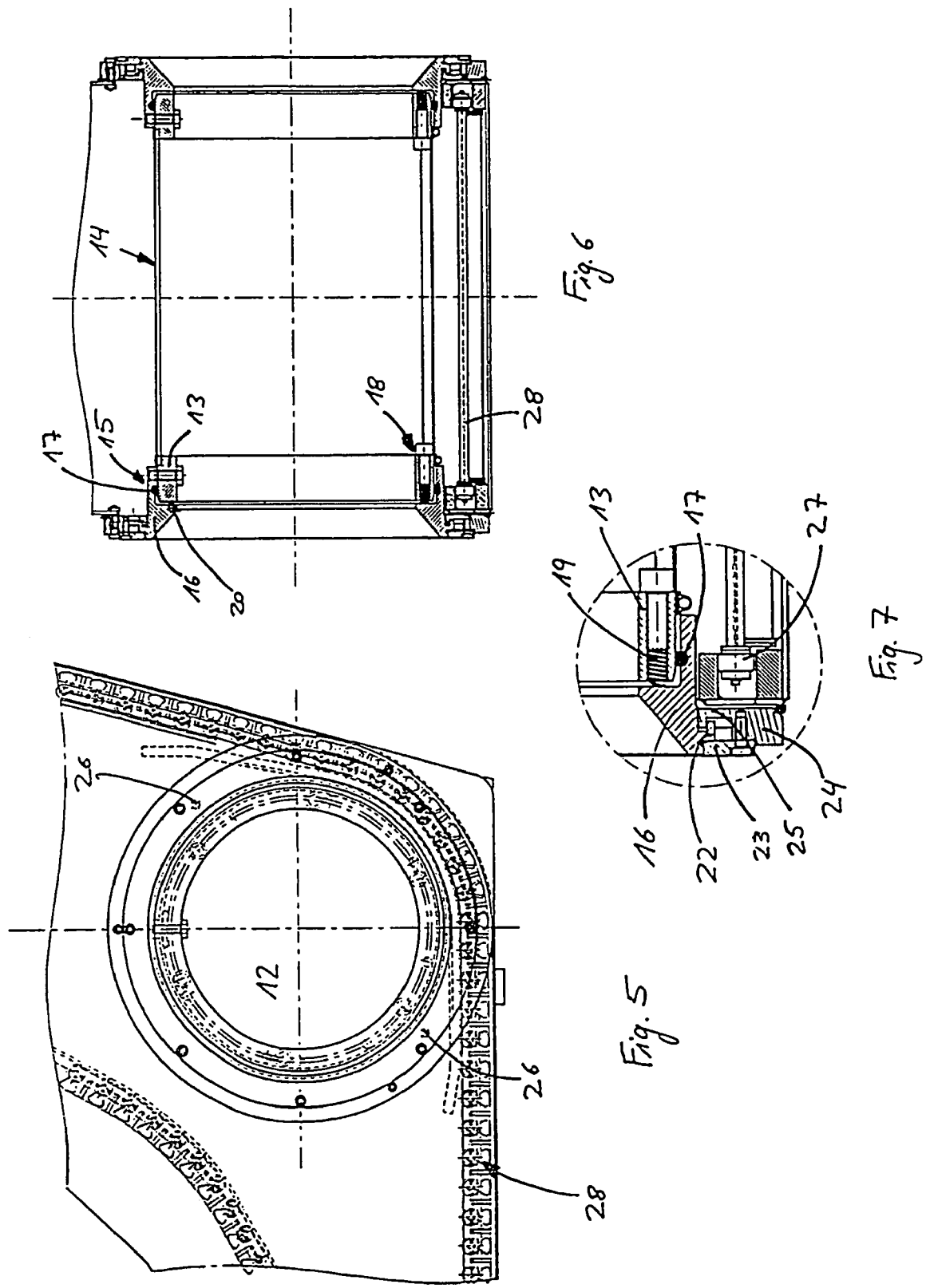

DEVICE FOR RECEIVING AND SEPARATING CHIPS AND COOLING LIQUID DISCHARGED FROM MACHINE TOOLS (SEALING)

RELATED APPLICATIONS

This Application is a continuation application of U.S. patent application Ser. No. 10/492,486, filed Apr. 9, 2004 now U.S. Pat. No. 7,014,764.

DESCRIPTION

The present invention relates to a device for receiving and separating chips and coolant discharged from machine tools, the coolant being returned for reuse and the chips being removed, having a receiving tank to receive the chips and the coolant, a rising guide section adjoining the receiving tank, an elevated discharge section adjoining the guide section, a chain-like closed transport element, which, at least in the region receiving the chips and the coolant and in the discharge section, is guided over deflection elements, at least one of which is coupled to a rotary drive, and a rotatably mounted filter drum, which is in drive connection to the transport element.

The bearings of such a filter drum are also necessarily subjected to axial stress and, as a consequence, are also always subject to wear.

The object of the present invention is therefore, above all, to reduce the wear occurring through axial bearing load and lower the requirements on the elements cooperating in the axial direction in a device of the type initially described.

This object is achieved according to the present invention in that the filter drum has an internal bearing ring on each of its two ends, each of which engages in an external bearing ring so that they rotate together, spring elements, which run parallel to the axis of the filter drum, are provided which are supported on one side on the internal bearing ring and on the other side on the external bearing ring, each of the external bearing rings is seated in a bearing shell, which is fixed to the housing, and is supported on it in the axial direction, and sealing elements are provided between each of the internal bearing rings and the external bearing rings.

Slight tolerance deviations between the internal and external bearing rings may be compensated by the arrangement of spring elements here.

In this case, the spring elements are preferably seated in a bore of the internal bearing ring and act on a face of the respective external bearing ring. Sealing elements between these two bearing rings prevent unfiltered coolant from being able to pass into the clean region by going around the filter. The spring pressure on the external bearing ring is transmitted in the axial direction onto the bearing shell, which is fixed to the housing, ice., into a zone in which the radial surfaces slide on one another and wear occurs. The spring pressure acting on the external bearing ring causes compensation in the event of this type of wear.

The device according to the present invention may be implemented in such a way that each of the external bearing rings forms a labyrinth seal with the bearing shell, which is fixed to the housing. For this purpose, it is expedient for the bearing shell, which is fixed to the housing, to be implemented in multiple parts. In addition, an annular sealing element may be arranged in the course of the labyrinth seal to further promote sealing.

In addition, it is possible to prevent the escape of unfiltered coolant into the clean region by applying filtered coolant under excess pressure to the seal from the outside, so that escape of unfiltered coolant to the outside, and therefore into the region of the filtered coolant, is counteracted very reliably. Furthermore, this prevents chips, which produce increased wear of the bearing, from being washed into the bearing with the unfiltered coolant penetrating into the bearing.

To prevent deposits in the inside of the filter drum, it may be expedient for the inner diameter of the internal bearing ring to be tailored to the smallest internal diameter of the external bearing ring and the internal diameter of the filter drum.

In the following, several embodiments of the device according to the present invention are described with reference to the drawing.

FIG. 1: shows a schematic side view of a device of the type described here,

FIG. 2: shows a detail view of a filter drum connected to a scraper chain,

FIG. 3: shows an axial section through the filter drum,

FIG. 4: shows a detail view of the bearings of the filter drum shown in FIGS. 2 and 3, FIG. 5: shows a detail view of a filter drum connected to a hinged belt conveyor, FIG. 6: shows an axial section through the filter drum shown in FIG. 5, FIG. 7: shows a detail section concerning the bearings of the filter drum shown in FIGS. 5 and 6, and FIG. 8: shows a detail section of bearing ring and pressure connection.

FIG. 1 shows the side view of an embodiment of the device according to the present invention having a receiving tank 1, which is open on top and receives the chips and coolant discharged from the machine tools. This receiving tank has an overflow edge 2. A rising guide section 3, which transits into an elevated discharge section 4, adjoins the receiving tank.

A scraper belt, guided on both sides by rollers, is provided here as a transport element. This scraper belt is guided around a lower deflection element 6 on the end of receiving tank 1 and runs around an upper deflection element 7, which is coupled to a drive, not shown, in the region of discharge section 4. The scraper belt carries scraper elements 9 arranged at intervals, which project downward in the region of the lower conveyor section, i.e., in the direction toward the bottom of receiving tank 1 and/or toward side wall 10 of rising section 3. The transport direction of scraper belt 5 is indicated by arrow 11.

A filter drum 12 is provided which is rotatably mounted in the housing of the device. The two ends of filter drum 12 are implemented as identical mirror images of one another.

They have an internal bearing ring 13, which carries filter covering 14 and engages axially outward in a shoulder seat 15 of an external bearing ring 16. Internal bearing ring 13 is therefore partially overlapped by shoulder seat 15 of external bearing ring 16. A sealing ring 17 is provided in the region of this overlap, which prevents unfiltered coolant from passing into the inside of the drum filter in the region of this overlap.

Internal bearing ring 13 is connected to external bearing ring 16 in the region of shoulder seat 15, which ensures that both bearing rings always rotate together, and therefore relative movements do not arise in the region of shoulder seat 15. Sealing ring 17 is therefore only statically stressed.

Multiple bores 18, which run parallel to the axis of drum filter 12, are provided in internal bearing ring 13, in each of which coil springs 19 are seated, which press against face 20 of external bearing ring 16. This has the consequence that external bearing ring 16 performs a pressure against external element 23 of the bearing shells mounted in the housing of the device via angular section 22 provided on its external axial edge. Occurrences of wear must be expected here in the course of time between angular section 22 and external element 23 of the bearing shells. Such occurrences of wear are compensated through the axial pressure performed by coil springs 19 without anything further.

External element 23 of the bearing shell is connected to an internal element 24, which, in its radially internal region, has an edge-shaped profile 25 which engages in the angular section of external bearing ring 16. Therefore, a labyrinth seal, which prevents the escape of unfiltered coolant, is formed on one side by the cooperation of external bearing element 23 and internal bearing element 24, and external bearing ring 16 with its hook-shaped angular section 22. This may be encouraged if filtered coolant is passed through the course of the seal in the region of the bearing. External bearing ring 16 is expanded conically toward the outside and its internal diameter is tailored to that of internal bearing ring 13 and the tension of the drum seal.

In the embodiment illustrated, a scraper belt 5 is provided which is guided on both sides via rollers 27.

The embodiment shown in FIGS. 5 to 7 differs from that previously described only in that a hinged belt conveyor 28 is provided in this case, which is also supported on both edges via rollers 27.

FIG. 8 shows internal bearing ring 13, which engages via screw 29 in external bearing ring 16 so that they rotate together. The bearing shell, which is fixed to the housing, and which is formed from internal bearing element 24 and external bearing element 23, has a pressure connection 26, via which the labyrinth seal formed from external bearing ring 16 and the bearing shell, which is fixed to the housing, is washed with filtered coolant.

While the present invention has been illustrated by the above description of embodiments, and while the embodiments have been described in some detail, it is not the intention of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept.

LIST OF REFERENCE NUMBERS 1 receiving tank
2 overflow edge
3 guide section
4 discharge section
5 scraper belt
6 deflection element
7 upper deflection element
8 -
9 scraper elements
10 side wall
11 arrow
12 filter drum
13 internal bearing ring
14 filter covering
15 shoulder seat
16 external bearing ring
17 seal
18 bore
19 coil springs
20 face
21 -
22 angular section
23 external bearing element
24 internal bearing element
25 edge-shaped profile
26 pressure connection
27 roller
28 hinged belt conveyor
29 screw

We claim:

1. A device for receiving and separating chips and coolant, comprising a filter drum rotatably mounted in a housing, the filter drum comprising:
   a. an internal bearing ring on each of two ends of the filter drum, each internal bearing ring engaging a corresponding external bearing ring so that the internal bearing ring and the external bearing ring rotate together; and
   b. at least one spring element that runs parallel to the axis of the filter drum and is supported on one side on the internal bearing ring and on the other side on the external bearing ring.

2. The device of claim 1, further comprising a bearing shell fixed to the housing.

3. The device of claim 2, wherein the external bearing ring is seated in the bearing shell.

4. The device of claim 2, wherein pressure from the spring elements on the external bearing ring is transmitted in the axial direction to the bearing shell.

5. The device of claim 1, wherein the internal bearing rings comprise at least one bore that runs parallel to the axis of the filter drum.

6. The device of claim 5, wherein the spring element is seated in the bore.

7. The device of claim 1, further comprising a plurality of spring elements.

8. A device for receiving and separating chips and coolant, comprising a filter drum rotatably mounted in a housing, the filter drum comprising:
   a. an internal bearing ring on each of two ends of the filter drum, each internal bearing ring engaging a corresponding external bearing ring so that the internal bearing ring and the external bearing ring rotate together;
   b. at least one bearing shell fixed to the housing, the bearing shell having a surface against which a surface of the external bearing ring slides; and
   c. means for compensating for wear between the external bearing ring and the bearing shell.

9. The device of claim 8, wherein the means for compensating for wear comprises at least one spring element disposed between and against the internal bearing ring and the external bearing ring, the spring element exerting pressure on the external bearing ring such that the spring pressure on the external bearing compensates for wear between the external bearing ring and the bearing shell.

10. The device of claim 9, wherein the internal bearing rings comprise at least one bore that runs parallel to the axis of the filter drum.

11. The device of claim 9, wherein the spring element is seated in the bore.

12. The device of claim 9, further comprising a plurality of spring elements.

13. A device for receiving and separating chips and coolant, comprising a filter drum rotatably mounted in a housing, the filter drum comprising:
   a. an internal bearing ring on each of two ends of the filter drum, each internal bearing ring engaging a corresponding external bearing ring so that the internal bearing ring and the external bearing ring rotate together;

b. a bearing shell in which the external bearing ring is seated; the bearing shell being fixed to the housing; and c. means for sealing the filter drum to prevent unfiltered coolant from passing into the interior of the filter drum.

14. The device of claim 13, wherein the sealing means comprises at least one sealing element disposed between the internal bearing ring and the corresponding external bearing ring.

15. The device of claim 13, wherein the sealing means comprises a labyrinth seal formed between the external bearing ring and the bearing shell.

16. The device of claim 15, further comprising at least one annular sealing element positioned in the labyrinth seal.

17. The device of claim 13, wherein the sealing means comprises a pressure connection for supplying filtered coolant to wash the space between the external bearing ring and the bearing shell.

* * * * *